(12) United States Patent
Lewis

(10) Patent No.: US 11,213,010 B1
(45) Date of Patent: Jan. 4, 2022

(54) PET TRACKING ASSEMBLY

(71) Applicant: David Lewis, Pittsburgh, PA (US)

(72) Inventor: David Lewis, Pittsburgh, PA (US)

( * ) Notice: Subject to any disclaimer, the term of this patent is extended or adjusted under 35 U.S.C. 154(b) by 0 days.

(21) Appl. No.: 17/324,774

(22) Filed: May 19, 2021

(51) Int. Cl.
*G08B 5/36* (2006.01)
*A01K 27/00* (2006.01)
*G08B 21/18* (2006.01)
*H04B 17/318* (2015.01)
*A01K 11/00* (2006.01)

(52) U.S. Cl.
CPC .......... *A01K 11/006* (2013.01); *A01K 27/001* (2013.01); *A01K 27/006* (2013.01); *G08B 5/36* (2013.01); *G08B 21/182* (2013.01); *H04B 17/318* (2015.01)

(58) Field of Classification Search
None
See application file for complete search history.

(56) References Cited

U.S. PATENT DOCUMENTS

| 4,675,656 | A | 6/1987 | Narcisse | |
|---|---|---|---|---|
| 6,693,585 | B1 * | 2/2004 | MacLeod | G01S 5/0027 342/357.55 |
| 7,259,671 | B2 | 8/2007 | Ganley | |
| 7,602,302 | B2 | 10/2009 | Hokuf | |
| 8,783,212 | B2 | 7/2014 | Bellon | |
| 9,258,982 | B1 | 2/2016 | Golden | |
| 9,786,138 | B1 * | 10/2017 | Kashyap | G08B 13/2491 |
| 9,955,423 | B2 * | 4/2018 | Kates | G08B 21/14 |
| 10,271,341 | B2 * | 4/2019 | Chang | H04W 52/0274 |
| 10,842,129 | B1 * | 11/2020 | Anderton | H04W 48/18 |
| 2009/0181638 | A1 * | 7/2009 | Gottlieb | H04W 76/50 455/404.1 |
| 2011/0134241 | A1 * | 6/2011 | Weissman | H04N 7/181 348/143 |
| 2014/0058778 | A1 * | 2/2014 | McLarty | H03J 1/0066 705/7.19 |
| 2015/0119070 | A1 * | 4/2015 | Harris | G01S 5/0205 455/456.1 |
| 2015/0342143 | A1 * | 12/2015 | Stewart | A01K 29/00 119/51.02 |
| 2016/0021506 | A1 * | 1/2016 | Bonge, Jr. | H04W 4/027 717/173 |
| 2016/0330593 | A1 * | 11/2016 | Caperell | H04W 4/023 |

(Continued)

FOREIGN PATENT DOCUMENTS

WO  WO2008136985  11/2008

*Primary Examiner* — Muhammad Adnan

(57) ABSTRACT

A pet tracking assembly includes a collar that is wearable around a neck of a pet. A light emitter is coupled to the collar to emit light outwardly from the collar when the light emitter is turned on. A monitoring unit is integrated into the collar and the monitoring unit is in wireless communication with a wireless internet router that is associated with the owner of the pet. The light emitter is turned on when the monitoring unit senses the signal from the wireless internet router has fallen below a pre-determined signal strength. Additionally, the monitoring unit broadcasts an alert to a personal electronic device when the monitoring unit senses the signal from the wireless internet router has fallen below the pre-determined signal strength. In this way the user is alerted that the pet has moved beyond the pre-determined distance from the wireless internet router.

6 Claims, 5 Drawing Sheets

(56) References Cited

U.S. PATENT DOCUMENTS

| | | | |
|---|---|---|---|
| 2017/0118659 A1* | 4/2017 | Alberte, Jr. | H04W 24/02 |
| 2017/0265432 A1* | 9/2017 | Anderton | G01S 5/02 |
| 2018/0139717 A1* | 5/2018 | Vered | H04W 64/00 |
| 2018/0249682 A1* | 9/2018 | Brian | A01K 27/005 |
| 2019/0020530 A1* | 1/2019 | Au | H04L 5/0057 |
| 2019/0158340 A1* | 5/2019 | Zhang | H04B 17/318 |
| 2019/0167106 A1* | 6/2019 | Couse | G16H 40/60 |
| 2020/0077892 A1* | 3/2020 | Tran | G08B 25/016 |

* cited by examiner

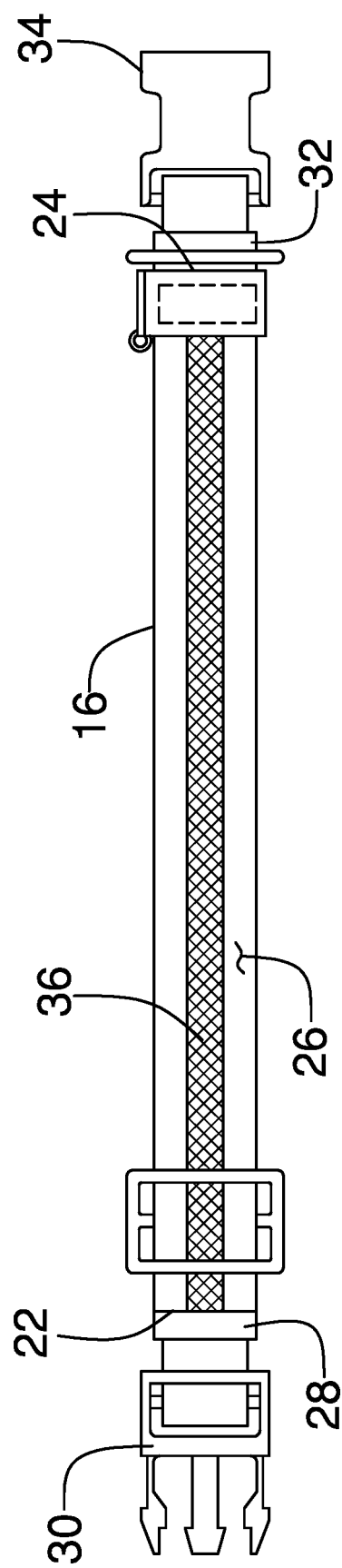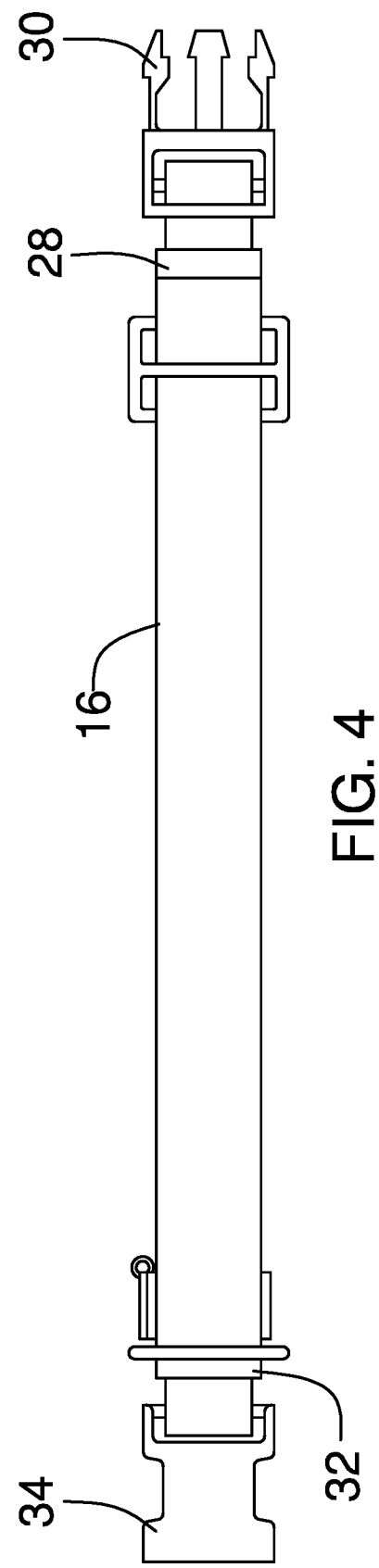

PET TRACKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to tracking devices and more particularly pertains to a new tracking device for alerting an owner when a pet has left the owner's property. The device includes a collar, a light emitter coupled to the collar and a monitoring unit coupled to the collar. The monitoring unit monitors the signal strength of a wireless internet router associated with the owner of the pet. Additionally, the light emitter is turned on and the owner's personal electronic device issues an alert when the monitoring unit senses the pet has moved beyond a predetermined distance from the wireless internet router.

(2) Description of Related Art Including Information Disclosed Under 37 CFR 1.97 and 1.98

The prior art relates to tracking devices including a variety of proximity alerts that includes a transceiver which broadcasts a tracking signal to a base unit such that the base unit can issue an alert when the transceiver moves beyond a predetermined distance from the base unit. The prior art discloses a pet tracking device that is worn on a pet and that is in communication with a tracking unit carried by a user to display the physical location of the pet with gps location. The prior art discloses an electro stimulation collar that has a docking port for a personal electronic device. The prior art discloses a pet proximity alert that includes a tracking unit worn on a pet and boundary defined by gps data for alerting a user when the pet has moved beyond the boundary.

BRIEF SUMMARY OF THE INVENTION

An embodiment of the disclosure meets the needs presented above by generally comprising a collar that is wearable around a neck of a pet. A light emitter is coupled to the collar to emit light outwardly from the collar when the light emitter is turned on. A monitoring unit is integrated into the collar and the monitoring unit is in wireless communication with a wireless internet router that is associated with the owner of the pet. The light emitter is turned on when the monitoring unit senses the signal from the wireless internet router has fallen below a pre-determined signal strength. Additionally, the monitoring unit broadcasts an alert to a personal electronic device when the monitoring unit senses the signal from the wireless internet router has fallen below the pre-determined signal strength. In this way the user is alerted that the pet has moved beyond the pre-determined distance from the wireless internet router.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front view of an embodiment of the disclosure.

FIG. 4 is a back view of an embodiment of the disclosure.

DETAILED DESCRIPTION OF THE INVENTION

Figure 1:
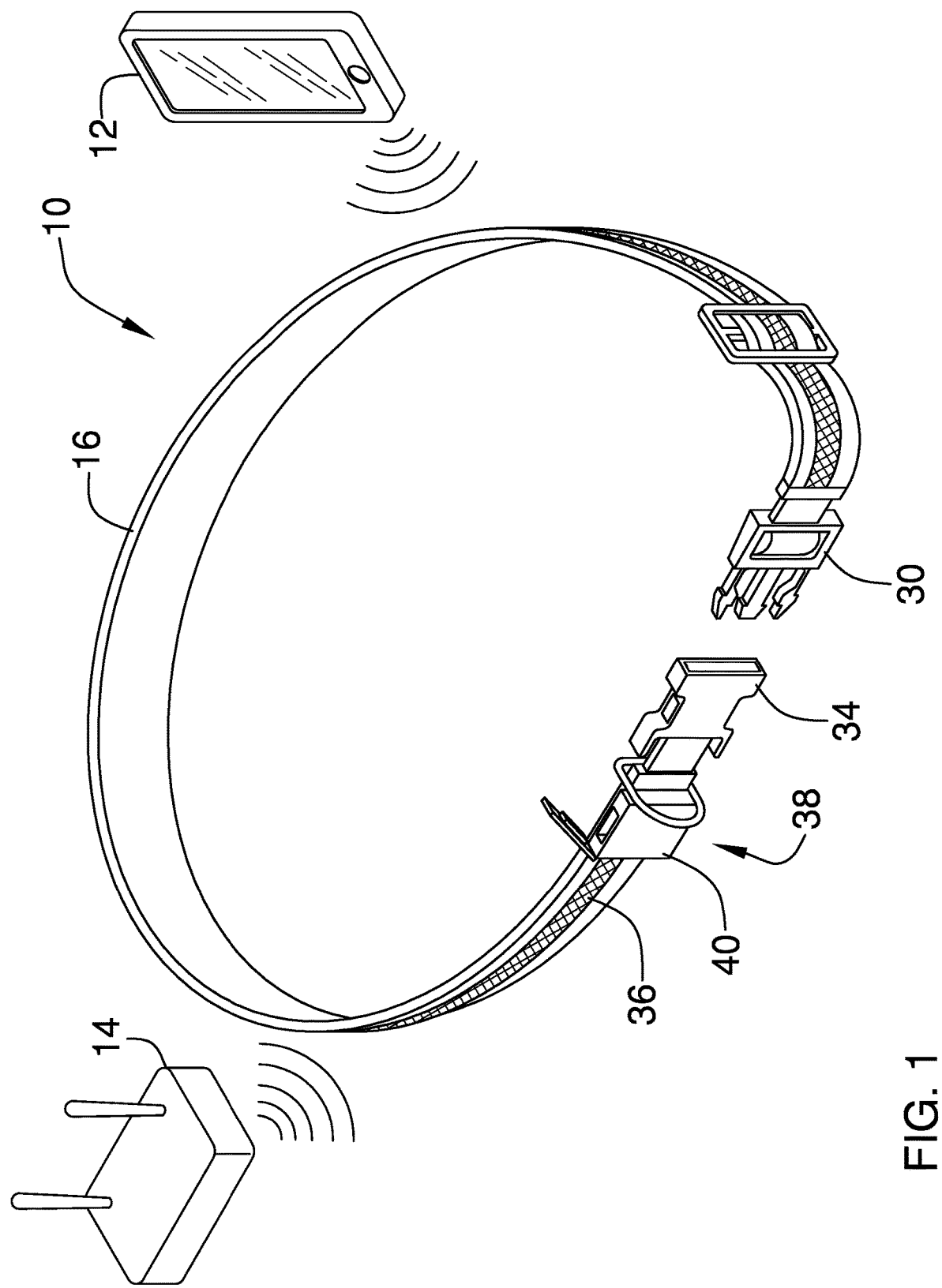
FIG. 1 is a perspective view of a pet tracking assembly according to an embodiment of the disclosure.
Figure 2:
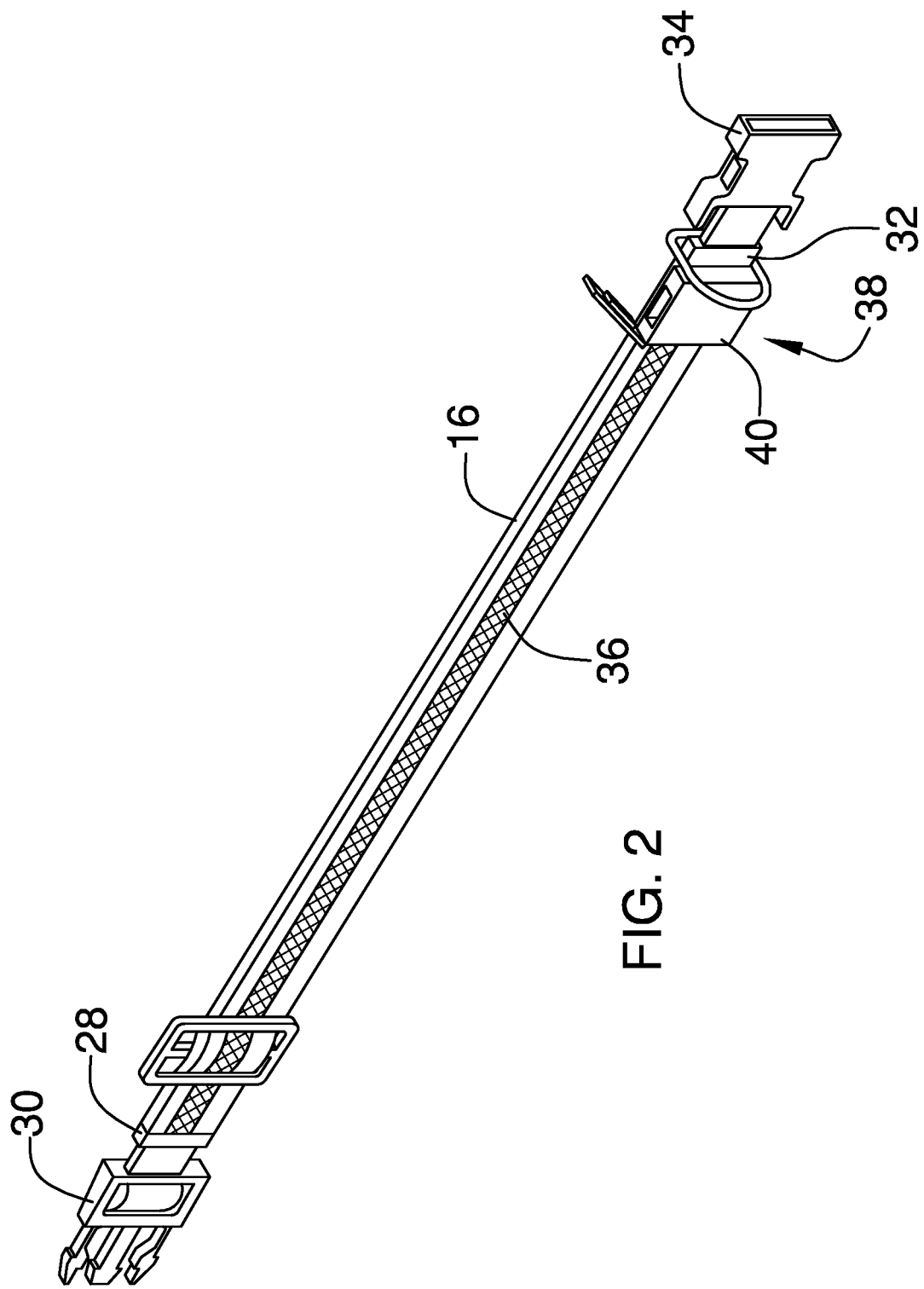
FIG. 2 is a front perspective view of an embodiment of the disclosure.
Figure 5:
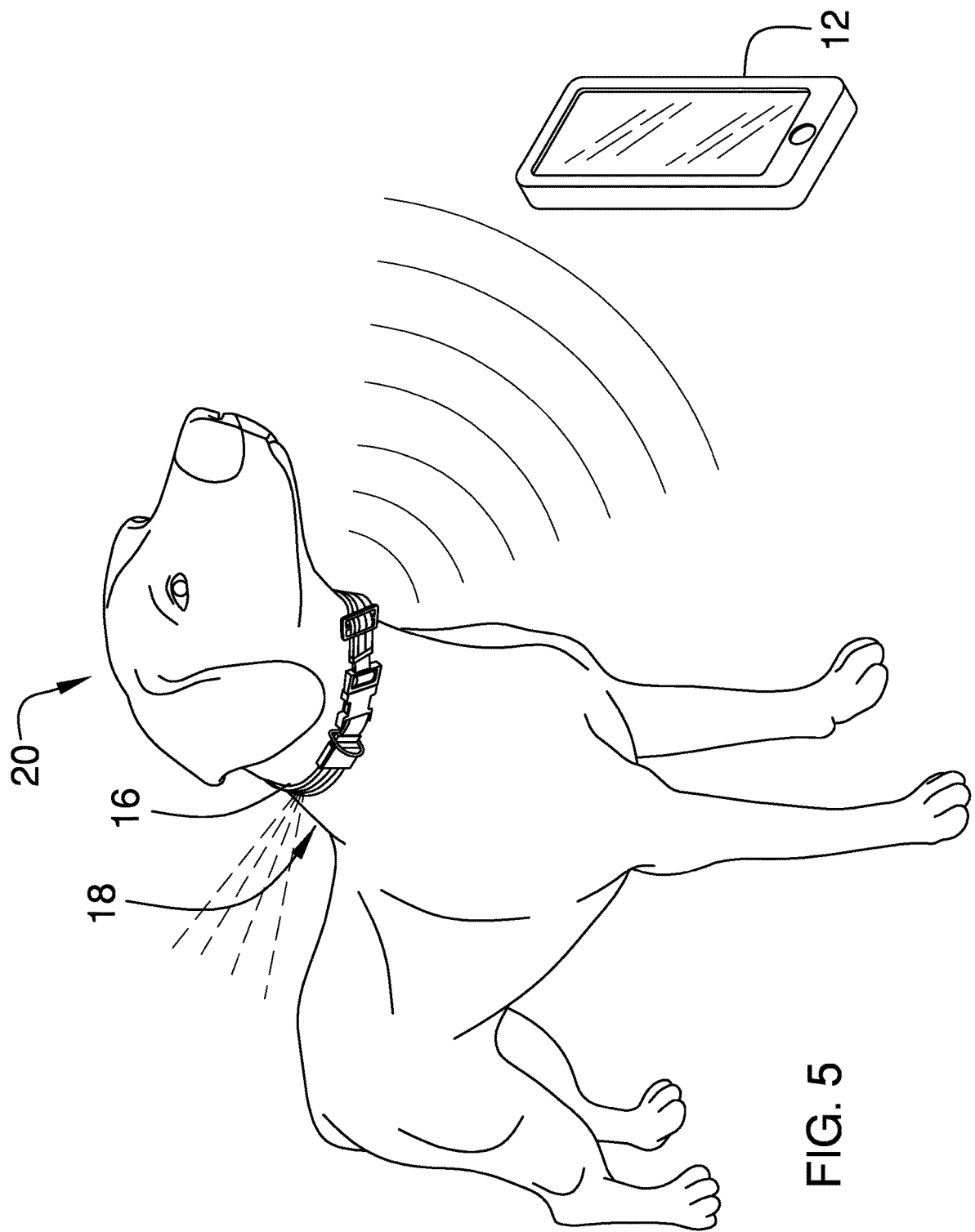
FIG. 5 is a perspective in-use view of an embodiment of the disclosure.
Figure 6:
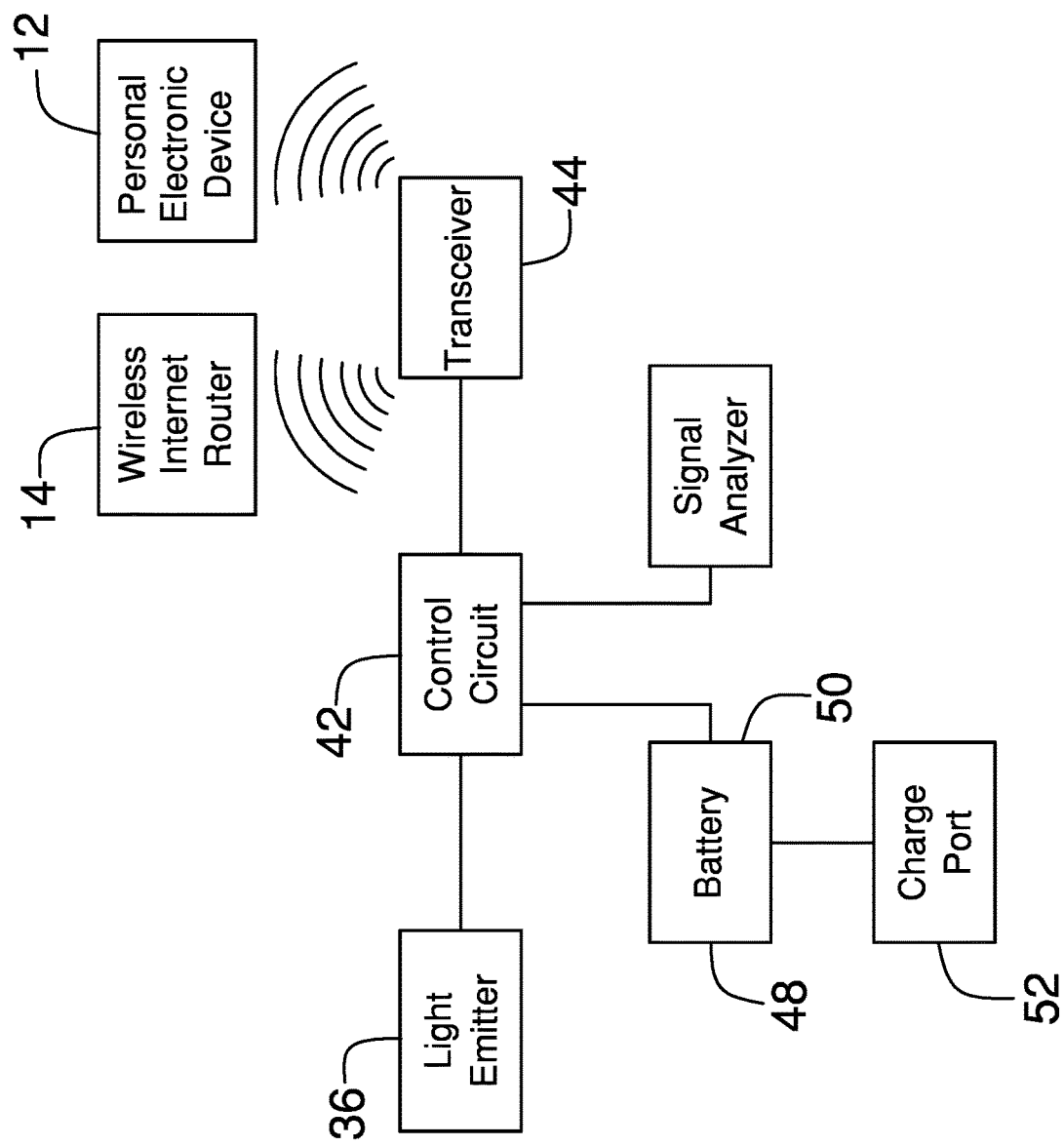
FIG. 6 is a schematic view of an embodiment of the disclosure.

With reference now to the drawings, and in particular to FIGS. 1 through 6 thereof, a new tracking device embodying the principles and concepts of an embodiment of the disclosure and generally designated by the reference numeral 10 will be described.

As best illustrated in FIGS. 1 through 6, the pet tracking assembly 10 generally comprises a personal electronic device 12 that is carried by an owner of a pet, such as a smart phone or other type of device 12 with wireless communication capabilities. A wireless internet router 14 is included which broadcasts a signal. The wireless internet router 14 may be positioned in the owner's residence and the wireless internet router 14 may be a wireless internet router of any conventional design. A collar 16 is provided that is wearable around a neck 18 of a pet 20, and the pet 20 may be a dog, a cat or other similar domesticated animal. The collar 16 has a first end 22, a second end 24 and a first surface 26 extending between the first end 22 and the second end 24.

A first magnet 28 is coupled to the collar 16 and the first magnet 28 is positioned on the first end 22 of the collar 16. A first mating unit 30 is disposed on the collar 16 and the first mating unit 30 extends away from the first magnet 28 along a line that is coextensive with a line extending through the first end 22 and the second end 24 of the collar 16. A second magnet 32 is coupled to the collar 16 and the second magnet 32 is positioned on the second end 24 of the collar 16. A second mating unit 34 is disposed on the collar 16 and the second mating unit 34 is matable to the first mating unit 30 such that the collar 16 forms a closed around the pet 20's neck 18. The second mating unit 34 extends away from the second magnet 32 along a line that is coextensive with a line extending through the second end 24 and the second end 24 of the collar 16. Additionally, each of the first mating unit 30 and the second mating unit 34 may comprise a set of complementary buckles, complementary quick release couplers or any other type of releasable, mechanical couplers.

A light emitter 36 is coupled to the collar 16 to emit light outwardly from the collar 16 when the light emitter 36 is turned on. The light emitter 36 is positioned on the first surface 26 of the collar 16 such that the light emitter 36 is exposed when the collar 16 is worn on the pet 20. The light emitter 36 is elongated to extend between the first end 22 and the second end 24 of the collar 16. Additionally, the light emitter 36 may comprise a light emitting diode that is elongated into a strip.

A monitoring unit 38 is integrated into the collar 16 and the monitoring unit 38 is in electrical communication with the light emitter 36. Additionally, the monitoring unit 38 is in wireless communication with the wireless internet router 14. The monitoring unit 38 monitors a signal strength of the wireless internet router 14 in order to determine the distance between the pet 20 and the wireless internet router 14. The light emitter 36 is turned on when the monitoring unit 38 senses the signal from the wireless internet router 14 has fallen below a pre-determined signal strength. In this way the light emitter 36 can visually communicate that the pet 20 has moved beyond a pre-determined distance from the wireless internet router 14. Additionally, the light emitter 36 makes the pet 20 highly visible at night, thereby reducing the likelihood that the pet 20 will be struck by traffic when the pet 20 leaves the owner's yard, for example.

The monitoring unit 38 is in wireless communication with the personal electronic device 12. Moreover, the monitoring unit 38 broadcasts an alert to the personal electronic device 12 when the monitoring unit 38 senses the signal from the wireless internet router 14 has fallen below the pre-determined signal strength. In this way the monitoring unit 38 can alert the user that the pet 20 has moved beyond the pre-determined distance from the wireless internet router 14.

The monitoring unit 38 comprises a housing 40 that is integrated into the collar 16 and a control circuit 42 is positioned in the housing 40. The control circuit 42 receives an alert input, the control circuit 42 is electrically coupled to the light emitter 36 and the light emitter 36 is turned on when the control circuit 42 receives the alert input. The monitoring unit 38 includes a transceiver 44 that is positioned in the housing 40 and the transceiver 44 is electrically coupled to the control circuit 42. The transceiver 44 is in wireless communication with the wireless internet router 14 and the transceiver 44 is in wireless communication with the personal electronic device 12. Additionally, the transceiver 44 broadcasts an alert signal to the personal electronic device 12 when the control circuit 42 receives the alert input. The transceiver 44 may comprise a radio frequency transceiver or the like and the transceiver 44 may employ a WPAN signal. Additionally, the transceiver 44 may employ Bluetooth communication protocols thereby facilitating communication with the personal electronic device 12.

The monitoring unit 38 includes a signal analyzer 46 that is positioned in the housing 40. The signal analyzer 46 is electrically coupled to the control circuit 42 and the signal analyzer 46 analyzes the signal received from the wireless internet router 14. The control circuit 42 receives the alert input when the signal analyzer 46 determines the signal received from the wireless internet router 14 has fallen below the pre-determined signal strength. The signal analyzer 46 may be an electronic signal analyzer 46 that can determine the signal strength of common internet router 14 signals.

A power supply 48 is positioned in the housing 40, the power supply 48 is electrically coupled to the control circuit 42 and the power supply 48 comprises at least one battery 50. A charge port 52 is recessed into the housing 40 such that the charge port 52 is electrically coupled to a charge cord. The charge port 52 is electrically coupled to the at least one battery for charging the at least one battery. The charge port 52 may be a universal serial bus port or other similar type of charge port.

In use, the collar 16 is worn on the pet 20's neck 18 and the personal electronic device 12 is synchronized with the transceiver 44. The light emitter 36 is turned on when the pet 20 moves beyond the predetermined distance from the wireless internet router 14. In this way the pet 20 is highly visible to the owner, traffic on roadways and other observers. Additionally, the personal electronic device 12 alerts the owner that the pet 20 has left the immediate area of the wireless internet router 14. The owner can remotely turn on the light emitter 36 with the personal electronic device 12 at any time the owner wishes.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A pet tracking assembly which illuminates and wirelessly alerts a pet owner when a pet moves outside of a pre-determined area, said assembly comprising:
   a collar being wearable around a neck of the pet;
   a first magnet being coupled to said collar;
   a first mating unit being disposed on said collar; a second magnet being coupled to said collar;

a second mating unit being disposed on said collar, said second mating unit being matable to said first mating unit such that said collar forms a closed loop around the pet's neck;

a light emitter being coupled to said collar wherein said light emitter is configured to emit light outwardly from said collar when said light emitter is turned on; and a monitoring unit being integrated into said collar, said monitoring unit being in electrical communication with said light emitter, said monitoring unit being in wireless communication with a wireless internet router being associated with the pet owner, said monitoring unit monitoring a signal strength of the wireless internet router wherein said monitoring unit is configured to determine distance between the pet and the wireless internet router based on the monitored signal strength, said light emitter being turned on when said monitoring unit senses the monitored signal strength from the wireless internet router has fallen below a pre-determined signal strength, wherein said light emitter is configured to visually communicate that the pet has moved beyond a pre-determined distance from the wireless internet router, said monitoring unit being in wireless communication with a personal electronic device carried by the pet owner when the monitored signal strength has fallen below the pre-determined signal strength, said monitoring unit simultaneously broadcasting an alert to the personal electronic device and turning on said light emitter when said monitoring unit senses the monitored signal strength from the wireless internet router has fallen below the pre-determined signal strength and, wherein said monitoring unit is configured to simultaneously alert the pet owner, by the broadcasting, and alert surrounding motorists, by the turning on said light emitter, that the pet has moved beyond the pre-determined distance from the wireless internet router.

2. The assembly according to claim 1, wherein: said collar has a first end, a second end and a first surface extending between said first end and said second end; said first magnet is positioned on said first end of said collar; said first mating unit extends away from said first magnet along a line being coextensive with a line extending through said first end and said second end of said collar; said second magnet is positioned on said second end of said collar; said second mating unit extending away from said second magnet along a line being coextensive with a line extending through said second end and said second end of said collar; and said light emitter being positioned on said first surface of said collar wherein said light emitter is configured to be exposed when said collar is worn on the pet, said light emitter being elongated to extend between said first end and said second end of said collar.

3. The assembly according to claim 1, wherein said monitoring unit comprises: a housing being integrated into said collar; a control circuit being positioned in said housing, said control circuit receiving an alert input, said control circuit being electrically coupled to said light emitter, said light emitter being turned on when said control circuit receives said alert input; a transceiver being positioned in said housing, said transceiver being electrically coupled to said control circuit, said transceiver being in wireless communication with the wireless internet router, said transceiver being in wireless communication with the personal electronic device, said transceiver broadcasting an alert signal to the personal electronic device when said control circuit receives said alert input.

4. The assembly according to claim 3, wherein said monitoring unit includes a signal analyzer being positioned in said housing, said signal analyzer being electrically coupled to said control circuit, said signal analyzer analyzing the signal received from the wireless internet router, said control circuit receiving said alert input when said signal analyzer determines the monitored signal strength received from the wireless internet router has fallen below the pre-determined signal strength.

5. A pet tracking assembly which illuminates and wirelessly alerts a pet owner when a pet moves outside of a pre-determined area, said assembly comprising:

a collar being wearable around a neck of the pet, said collar having a first end, a second end and a first surface extending between said first end and said second end;

a first magnet being coupled to said collar, said first magnet being positioned on said first end of said collar;

a first mating unit being disposed on said collar, said first mating unit extending away from said first magnet along a line being coextensive with a line extending through said first end and said second end of said collar;

a second magnet being coupled to said collar, said second magnet being positioned on said second end of said collar;

a second mating unit being disposed on said collar, said second mating unit being matable to said first mating unit such that said collar forms a closed around the pet's neck, said second mating unit extending away from said second magnet along a line being coextensive with a line extending through said second end and said second end of said collar;

a light emitter being coupled to said collar wherein said light emitter is configured to emit light outwardly from said collar when said light emitter is turned on, said light emitter being positioned on said first surface of said collar wherein said light emitter is configured to be exposed when said collar is worn on the pet, said light emitter being elongated to extend between said first end and said second end of said collar; and a monitoring unit being integrated into said collar, said monitoring unit being in electrical communication with said light emitter, said monitoring unit being in wireless communication with a wireless internet router being associated with the pet owner, said monitoring unit monitoring a signal strength of the wireless internet router wherein said monitoring unit is configured to determine distance between the pet and the wireless internet router based on the monitored signal strength, said light emitter being turned on when said monitoring unit senses the monitored signal from the wireless internet router has fallen below a pre-determined signal strength, wherein said light emitter is configured to visually communicate that the pet has moved beyond a pre-determined distance from the wireless internet router, said monitoring unit being in wireless communication with a personal electronic device carried by the pet owner when the monitored signal strength has fallen below the pre-determined signal strength, said monitoring unit broadcasting an alert to the personal electronic device when said monitoring unit senses the monitored signal strength from the wireless internet router has fallen below the pre-determined signal strength wherein said monitoring unit is configured to simultaneously alert the the pet owner, by the broadcasting, and alert surrounding motorists, by the turning on said light emitter, that the pet has moved beyond the pre-determined distance from the wireless internet router, said monitoring unit comprising:

a housing being integrated into said collar;

a control circuit being positioned in said housing, said control circuit receiving an alert input, said control circuit being electrically coupled to said light emitter, said light emitter being turned on when said control circuit receives said alert input;

a transceiver being positioned in said housing, said transceiver being electrically coupled to said control circuit, said transceiver being in wireless communication with the wireless internet router, said transceiver being in wireless communication with the personal electronic device, said transceiver broadcasting an alert signal to the personal electronic device when said control circuit receives said alert input;

a signal analyzer being positioned in said housing, said signal analyzer being electrically coupled to said control circuit, said signal analyzer analyzing the signal received from the wireless internet router, said control circuit receiving said alert input when said signal analyzer determines the signal received from the wireless internet router has fallen below the pre-determined signal strength;

a power supply being positioned in said housing, said power supply being electrically coupled to said control circuit, said power supply comprising at least one battery; and a charge port being recessed into said housing wherein said charge port is configured to be electrically coupled to a charge cord, said charge port being electrically coupled to said at least one battery for charging said at least one battery.

6. A pet tracking system which illuminates and wirelessly alerts a pet owner when a pet moves outside of a pre-determined area, said system comprising:

a personal electronic device being carried by the pet owner;

a wireless internet router, associated with the pet owner, broadcasting a signals;

a collar being wearable around a neck of a pet, said collar having a first end, a second end and a first surface extending between said first end and said second end;

a first magnet being coupled to said collar, said first magnet being positioned on said first end of said collar;

a first mating unit being disposed on said collar, said first mating unit extending away from said first magnet along a line being coextensive with a line extending through said first end and said second end of said collar;

a second magnet being coupled to said collar, said second magnet being positioned on said second end of said collar;

a second mating unit being disposed on said collar, said second mating unit being matable to said first mating unit such that said collar forms a closed loop around the pet's neck, said second mating unit extending away from said second magnet along a line being coextensive with a line extending through said second end and said second end of said collar;

a light emitter being coupled to said collar wherein said light emitter is configured to emit light outwardly from said collar when said light emitter is turned on, said light emitter being positioned on said first surface of said collar wherein said light emitter is configured to be exposed when said collar is worn on the pet, said light emitter being elongated to extend between said first end and said second end of said collar; and a monitoring unit being integrated into said collar, said monitoring unit being in electrical communication with said light emitter, said monitoring unit being in wireless communication with said wireless internet router, said monitoring unit monitoring a signal strength of said wireless internet router, wherein said monitoring unit is configured to determine distance between the pet and said wireless internet router based on the monitored signal strength, said light emitter being turned on when said monitoring unit senses the monitored signal strength from said wireless internet router has fallen below a pre-determined signal strength wherein said light emitter is configured to visually communicate that the pet has moved beyond a pre-determined distance from the wireless internet router, said monitoring unit being in wireless communication with a personal electronic device carried by the pet owner when the monitored signal strength has fallen below the pre-determined signal strength, said monitoring unit simultaneously broadcasting an alert to the personal electronic device and turning on said light emitter when said monitoring unit senses the monitored signal strength from the wireless internet router has fallen below the pre-determined signal strength, wherein said monitoring unit is configured to simultaneously alert the pet owner, by the broadcasting, and alert surrounding motorists, by the turning on said light emitter, that the pet has moved beyond the pre-determined distance from the wireless internet router, said monitoring unit comprising:

a housing being integrated into said collar;

a control circuit being positioned in said housing, said control circuit receiving an alert input, said control circuit being electrically coupled to said light emitter, said light emitter being turned on when said control circuit receives said alert input;

a transceiver being positioned in said housing, said transceiver being electrically coupled to said control circuit, said transceiver being in wireless communication with said wireless internet router, said transceiver being in wireless communication with said personal electronic device, said transceiver broadcasting an alert signal to said personal electronic device when said control circuit receives said alert input;

a signal analyzer being positioned in said housing, said signal analyzer being electrically coupled to said control circuit, said signal analyzer analyzing said signal received from said wireless internet router, said control circuit receiving said alert input when said signal analyzer determines said signal received from said wireless internet router has fallen below the pre-determined signal strength;

a power supply being positioned in said housing, said power supply being electrically coupled to said control circuit, said power supply comprising at least one battery; and a charge port being recessed into said housing wherein said charge port is configured to be electrically coupled to a charge cord, said charge port being electrically coupled to said at least one battery for charging said at least one battery.

* * * * *